United States Patent
Ekambaram et al.

(10) Patent No.: US 10,942,617 B2
(45) Date of Patent: Mar. 9, 2021

(54) RUNTIME ADAPTATION OF AUGMENTED REALITY GAMING CONTENT BASED ON CONTEXT OF SURROUNDING PHYSICAL ENVIRONMENT

(71) Applicant: International Business Machines Corporation, Armonk, NY (US)

(72) Inventors: Vijay Ekambaram, Chennai (IN); Padmanabha Venkatagiri Seshadri, Mysore (IN); Saravanan Sadacharam, Chennai (IN); Vijay Kumar Ananthapur Bache, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/242,361

(22) Filed: Jan. 8, 2019

(65) Prior Publication Data
US 2020/0218426 A1 Jul. 9, 2020

(51) Int. Cl.
*G06F 3/01* (2006.01)
*G06F 3/0481* (2013.01)
*G06T 19/00* (2011.01)

(52) U.S. Cl.
CPC .......... *G06F 3/04815* (2013.01); *G06F 3/011* (2013.01); *G06F 3/016* (2013.01); *G06T 19/006* (2013.01); *G06F 2203/013* (2013.01)

(58) Field of Classification Search
CPC ........ G06T 19/006; G06F 3/011; G06F 3/016; G06F 3/04815; G06F 2203/013
(Continued)

(56) References Cited

U.S. PATENT DOCUMENTS 8,266,536 B2 9/2012 Roberts et al.
9,155,964 B2 10/2015 Aronzon et al.
(Continued)

FOREIGN PATENT DOCUMENTS

GB 2376397 A 12/2002

OTHER PUBLICATIONS

R. Van Den Berg et al., "Collision Avoidance Between Avatars of Real and Virtual Individuals," In Motion in Games: Second International Workshop (MIG), Nov. 21-24, 2009, pp. 1-12.
(Continued)

*Primary Examiner* — Jacinta M Crawford
(74) *Attorney, Agent, or Firm* — Ryan, Mason & Lewis, LLP

(57) ABSTRACT

Systems and methods are provided for run-time adaptation of augmented reality gaming content that is rendered on a computing device based on a context of a surrounding physical environment. For example, an augmented reality gaming application is streamed to a computing device of a user. During run-time execution of the augmented reality gaming application, a detection process is performed to detect an unsafe region in a physical environment surrounding the computing device of the user. Responsive to detecting the unsafe region in the physical environment, the content of the augmented reality gaming application is automatically adapted by changing a position or trajectory of a user-interaction object in a virtual gaming environment of the augmented reality gaming application such that the adapted content leads the user of the computing device on a path that avoids the detected unsafe region in the physical environment.

17 Claims, 10 Drawing Sheets

(58) Field of Classification Search
USPC .......................................... 345/7, 8, 418, 419
See application file for complete search history.

(56) References Cited

U.S. PATENT DOCUMENTS

| | | | |
|---|---|---|---|
| 9,754,167 B1* | 9/2017 | Holz | G06T 19/006 |
| 9,812,046 B2 | 11/2017 | Latta et al. | |
| 9,865,089 B2 | 1/2018 | Burns et al. | |
| 9,911,232 B2 | 3/2018 | Shapira et al. | |
| 10,025,377 B1 | 7/2018 | Bastide et al. | |
| 10,032,315 B1 | 7/2018 | Carr et al. | |
| 10,075,758 B2 | 9/2018 | Ayers et al. | |
| 2010/0103196 A1 | 4/2010 | Kumar et al. | |
| 2015/0348330 A1 | 12/2015 | Balachandreswaran et al. | |
| 2018/0093186 A1* | 4/2018 | Black | A63F 13/25 |
| 2018/0190022 A1* | 7/2018 | Zamir | G06T 19/006 |
| 2018/0299956 A1* | 10/2018 | Chen | G06F 3/015 |
| 2018/0350118 A1* | 12/2018 | Bastaldo-Tsampalis | G06T 19/006 |
| 2019/0221035 A1* | 7/2019 | Clark | G06T 19/20 |

OTHER PUBLICATIONS

J.-W. Choi et al., "Obstacle Avoiding Real-Time Trajectory Generation of Omnidirectional Vehicles," American Control Conference, Jun. 10-12, 2009, 6 pages.

S. Yang et al., "Obstacle Avoidance Through Deep Networks Based Intermediate Perception," arXiv:1704.08759v1, Apr. 27, 2017, 7 pages.

A. Al-Kaff et al., "Obstacle Detection and Avoidance System Based on Monocular Camera and Size Expansion Algorithm for UAVs," Sensors, May 7, 2017, 22 pages, vol. 17, No. 5.

Tommy Palladino, "News: Disney Has Figured Out How to Make AR Content React to Real-World Obstacles," next.reality.news/news/disney-has-figured-out-make-ar-content-react-real-world-obstacles-0181601/, Dec. 11, 2017, 2 pages.

C. Hutton et al., "A Realistic Walking Model for Enhancing Redirection in Virtual Reality," IEEE Virtual Reality Conference, Mar. 19-23, 2016, pp. 183-184.

M. Azmandian et al., "An Enhanced Steering Algorithm for Redirected Walking in Virtual Environments," IEEE Virtual Reality Conference, Mar. 29-Apr. 2, 2014, pp. 65-66.

W. Song et al., "A 3D Localisation Method in Indoor Environments for Virtual Reality Applications," Human-Centric Computing and Information Sciences, Dec. 2017, 11 pages.

oculus.com, "Announcing the Acquisition of Surreal Vision," oculus.com/blog/announcing-the-acquisition-of-surreal-vision/, May 26, 2015, 2 pages.

D.R.A. Rambli et al., "Story Line in Image-Based Virtual Reality for Enhancing Spatial Presence Experience," International Conference on Computer and Information Sciences (ICCOINS), Jun. 3-5, 2014, 6 pages.

\* cited by examiner

RUNTIME ADAPTATION OF AUGMENTED REALITY GAMING CONTENT BASED ON CONTEXT OF SURROUNDING PHYSICAL ENVIRONMENT

TECHNICAL FIELD

This disclosure relates generally to the field of augmented reality, and more particularly to augmented reality gaming systems.

BACKGROUND

Augmented reality relates to technology that modifies a direct or indirect user view of a real-world environment with computer-generated elements using various inputs, such as sound data, image data, or location data. In particular, an augmented reality application comprises a software application that integrates digital visual and audio content (and other types of content) into a user's real-world environment. Various devices may be implemented with augmented reality such as eyeglasses, head-mounted displays, head-up displays, contact lenses, virtual reality displays, and handheld displays. Augmented reality is utilized for various applications including, for example, literature, architecture, visual art, education, emergency management, video gaming, healthcare, military, navigation, tourism, language translation, and music production.

Augmented reality gaming (or AR gaming) is the integration of visual and audio gaming content with the user's environment in real time. In contrast to virtual reality gaming, which often requires a separate room or confined area to create an immersive environment, AR gaming applications are configured to generate a virtual gaming environment and superimpose the virtual gaming environment on top of the user's physical environment. AR games are typically played on computing devices such as smartphones, electronic tablets, and other portable gaming devices. AR games can include, for example, in-game characters and objects that move within the gaming environment. In this regard, many AR games require user interaction which involves the user moving along trajectory paths within the physical environment to effect user movement within the virtual environment. However, as the user moves within the physical environment while viewing the portable AR gaming device (e.g., smartphone), the user can inadvertently wander into unsafe regions within the physical environment, resulting in possible injury to the user or others. For example, a user can be injured by accidently tripping over, or bumping into, a physical object as the user moves within the physical environment while viewing the AR gaming device.

SUMMARY

Embodiments of the invention generally include systems and methods for run-time adaptation of augmented reality gaming content that is rendered on a user computing device based on a context of a surrounding physical environment. For example, in one embodiment, a computer-implemented method comprises: streaming an augmented reality gaming application to a computing device; during run-time execution of the augmented reality gaming application, detecting an unsafe region in a physical environment surrounding the computing device; and responsive to detecting the unsafe region in the physical environment, automatically adapting content of the augmented reality gaming application by changing one of: a position and a trajectory of a user-interaction object in a virtual gaming environment of the augmented reality gaming application, such that the adapted content leads a user of the computing device on a path that avoids the detected unsafe region.

In another embodiment, a computer-implemented method comprises: streaming an augmented reality gaming application to a computing device of a user; during run-time execution of the augmented reality gaming application, detecting an unsafe region in a physical environment surrounding the computing device of the user; and responsive to detecting the unsafe region in the physical environment: determining a user trajectory avoidance path around the detected unsafe region in the physical environment; determining a user-interaction object within the augmented reality gaming environment which is influencing a current user trajectory path of the user towards the detected unsafe region; and automatically adapting content of the augmented reality gaming application by changing one of a position and a trajectory of the determined user-interaction object such that the adapted content leads the user of the computing device along the determined user trajectory avoidance path and thus around the detected unsafe region in the physical environment.

Other embodiments will be described in the following detailed description of embodiments, which is to be read in conjunction with the accompanying figures.

DETAILED DESCRIPTION

Embodiments of the invention will now be discussed in further detail with regards to systems and methods for run-time adaptation of augmented reality gaming content that is rendered on a user computing device based on the context of a physical environment that surrounds the user computing device. As explained in further detail below, systems and methods are provided to dynamically create or change a game trajectory path of an augmented reality gaming application in real-time based on the user's physical environment while the user is playing the augmented reality game. In particular, in the domain of augmented reality gaming which results in the movement of the user to interact with the augmented reality game, embodiments of the invention implement systems and methods for automatically adapting the content of the augmented reality game with respect to the position or trajectory of user-interaction objects that are rendered in the digital gaming environment, such that the adapted content leads the user of the computing device on a user trajectory path which avoids unsafe regions (e.g., obstacle) in the physical environment.

In some embodiments, the content adaptation process involves runtime discovering and applying an optimal trajectory adaptation of specific user-interaction objects within the augmented reality gaming environment for leading the user away from unsafe regions (e.g., obstacles) in the physical environment. For example, virtual interaction objects are positioned in the augmented reality gaming environment such that the user's corresponding physical trajectory path will not lead to unnoticed obstacles which could risk injury to the user by, e.g., tripping over an obstacle or inadvertently banging into an obstacle as the user moves along a physical trajectory path while interacting with the augmented reality game. As explained in further detail below, the content adaptation is performed in a way to maximize user gaming experience while minimizing a risk-score of directing the user along trajectory paths which avoid the unsafe regions.

Figure 1:
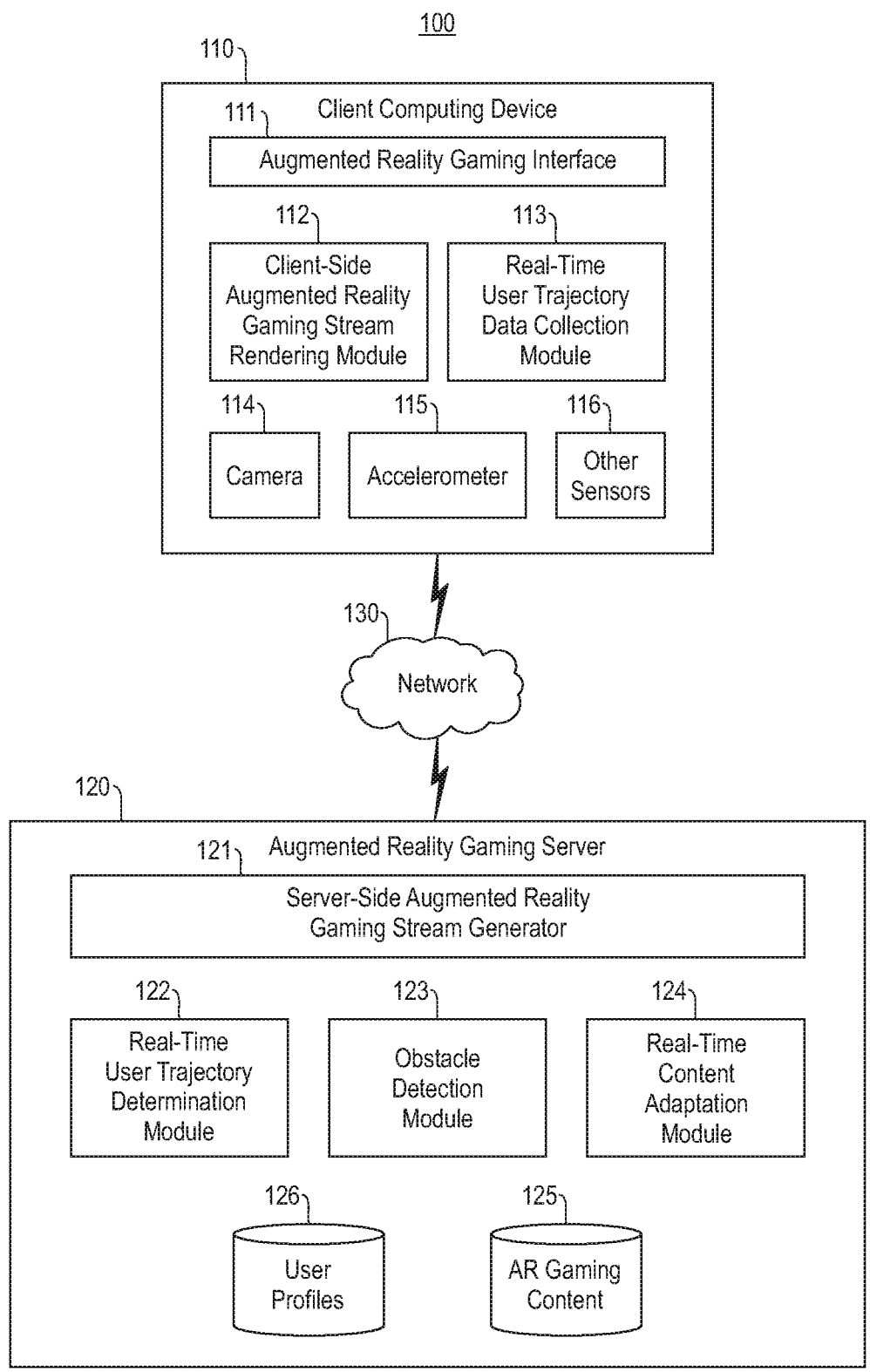
FIG. 1 schematically illustrates a computing system for providing run-time adaptation of augmented reality gaming content that is rendered on a user computing device based on a context of a surrounding physical environment, according to an embodiment of the invention.

FIG. 1 schematically illustrates a computing system for providing run-time adaptation of augmented reality gaming content that is rendered on a user computing device based on a context of a surrounding physical environment, according to an embodiment of the invention. In particular, FIG. 1 illustrates a system 100 comprising a client computing device 110, an augmented reality gaming server 120, and a communications network 130. The client computing device 110 comprises an augmented reality gaming interface 111, a client-side augmented reality gaming stream rendering module 112, a real-time user trajectory data collection module 113, a camera 114, an accelerometer 115, and other sensors 116, the function of which will be explained in further detail below. The gaming server 120 comprises a server-side augmented reality gaming stream generator module 121, a real-time user trajectory determination module 122, an obstacle detection module 123, a real-time content adaptation module 124, and data stores of AR gaming content 125 and user profiles 126, the functions of which will be explained in further detail below.

The client computing device 110 can be any type of mobile computing device such as an electronic tablet, a smart phone, a portable laptop computer, a portable AR gaming device, etc., which is utilized by an end user to access the gaming server 120 over the communications network 130 and obtain AR gaming content which is streamed to the client computing device 110 from the gaming server 120 and rendered on the client computing device 110. The communications network 120 may comprise any type of communications network (or combinations of networks), such as a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks.

The augmented reality gaming interface 111 comprises any suitable interface to enable a user to play, utilize, access, and interact with an augmented reality game on the client computing device 110. For example, in one embodiment, the augmented reality gaming interface 111 comprises a touch screen on the computing device 110 which is configured to display an augmented reality game and allow the user to interact with the game through tactile interaction. The client-side augmented reality gaming stream rendering module 112 is configured to obtain an augmented reality multi-media stream from the gaming server 120 and render the streaming data over an image of the physical environment which is captured by the device camera 114. The real-time user trajectory data collection module 113 is configured to obtain data captured by one or more of the camera 114, the accelerometer 115, and other sensors 116, and process the data to determine or otherwise estimate/extrapolate a user's target trajectory path while interacting with the augmented reality game rendered on the gaming interface 111 (e.g., displayed on the touch screen display).

In one embodiment, the camera 114 is configured to continually operate in an image capture mode while the user is interacting with the augmented reality game on the computing device 110 to capture images of the physical environment surrounding the user on a continuous basis. The accelerometer 115 is configured to capture the motion and orientation of the computing device 110. In some embodiments, the additional sensors 116 may include, e.g., a speaker to capture the user's voice, and other sensors to detect user gestures, e.g., eye movement, facial tracking detection, etc., while the user is interacting with the augmented reality game on the computing device 110. The image and sensor data are collected by the real-time user trajectory data collection module 112 and then processed in real-time to continuously detect, estimate or otherwise extrapolate the user's current trajectory path while interacting with the augmented reality game on the computing device 110.

On the augmented reality gaming server 120, the server-side augmented reality gaming stream generator 121 is configured to utilize the AR gaming content 125 to generate an audio/video stream for the augmented reality game based on a current state of the game play, and transmit the audio/video stream to the client computing device 110 for processing and rendering by the client-side augmented reality gaming stream rendering module 112. In one embodiment, the real-time user trajectory determination module 122 is configured to analyze the image and sensor data (which are collected/aggregated by the client-side real-time user trajectory data collection module 113) to continuously detect, estimate or otherwise extrapolate the user's current trajectory path while interacting with the augmented reality game on the computing device 110. In other embodiments, the functions for real-time determination of the user's current trajectory path are performed, for example, in whole or in part by the real-time user trajectory data collection module 113 on the client computing device 110.

The obstacle detection module 123 implements methods that are configured to process the image data captured by the device camera 114 to detect the presence of unsafe regions (e.g., obstacles) in the physical environment of the user while interacting with the AR gaming application on the computing device 110. The obstacle detection module 123 can implement one or more well-known state-of-the-art obstacle detection and avoidance techniques, which are suitable for the given application. For instance, in one example embodiment, the obstacle detection module 123 implements methods as disclosed in the article by Abdulla Al-Kaff, et al. entitled "Obstacle Detection and Avoidance System Based on Monocular Camera and Size Expansion Algorithm for UAVs," Sensors 2017, Volume 17, Issue 5, 1061; doi:10.3390/s17051061, which is incorporated herein by reference. In other embodiments, the obstacle detection module 123 implements methods as disclosed in the article by Shichao Yang, et al., entitled "Obstacle Avoidance through Deep Networks based Intermediate Perception," Robotics (cs.RO); Computer Vision and Pattern Recognition (cs.CV) (arXiv:1704.08759v1 [cs.RO] 27 Apr. 2017), which is incorporated herein by reference.

The real-time content adaptation module 124 implements methods that are configured to automatically adapt (in real-time) the content of the augmented reality gaming application with respect to the positions and/or trajectories of user-interaction objects in the virtual gaming environment of the augmented reality gaming application, such that the adapted content leads a user of the computing device 110 on a user trajectory path that avoids unsafe regions in the physical environment which are detected by the obstacle detection module 123. The real-time content adaptation module 124 obtains and analyzes (i) the current user trajectory information as determined by the real-time user trajectory determination module 122 and (ii) the unsafe regions detected by the obstacle detection module 123. Furthermore, the real-time content adaptation module 124 utilizes such information to automatically adapt the AR gaming content using a process which comprises (i) determining user trajectory avoidance paths around each of the detected unsafe regions in the physical environment, (ii) determining an associated risk-score for each of the determined user trajectory avoidance paths, (iii) determining a user-interaction object within the augmented reality gaming environment which could lead the user along a user trajectory path towards an unsafe region within the physical environment, (iv) determining a cost of adapting the content of the augmented reality gaming application by changing a position or a trajectory of the determined user-interaction object, and (v) changing the position or the trajectory of the determined user-interaction object, if the determined cost is minimized (e.g., the determined cost does not exceed a minimum cost threshold which is predefined or determined as per an optimization analysis), the details of which will be explained in further detail below.

The user profiles database 126 stores various types of user information which is utilized by the gaming server 120. For example, the user profiles database 126 stores user registration information (e.g., passwords, IDs, etc.) which are utilized by the gaming server 120 to provide gaming services to registered users. In addition, the user profiles database 126 stores historical information regarding, e.g., user gaming patterns, maps, and other relevant information regarding physical environments (e.g., home) where the user typically plays the AR game, etc., as well as other information that allows the gaming server 120 to enhance the run-time processing capabilities to provide seamless AR game streaming services.

While the augmented reality gaming server 120 is generically illustrated in FIG. 1 for illustrative purposes, it is to be understood that the augmented reality gaming server 120 (and constituent modules thereof) may be distributed over a plurality of computing nodes (e.g., a cluster of servers, virtual machines, etc.) that collectively operate to implement the associated functions described herein. In addition, the data stores 125 and 126 may be implemented using any suitable type of data storage system or combination of data storage systems, including, but not limited to storage area network (SAN) systems, direct attached storage (DAS) systems, a serial attached storage (SAS/SATA) system, as well as other types of data storage systems comprising clustered or distributed virtual and/or physical infrastructure. In one embodiment, the augmented reality gaming server 120 may be implemented in a data center or a cloud computing platform that performs data computing and data storage functions, etc., to generate and deliver AR gaming content to various end users. In another embodiment, the augmented reality gaming server 120 may be implemented in a private network or home environment for personal use.

Figure 2:
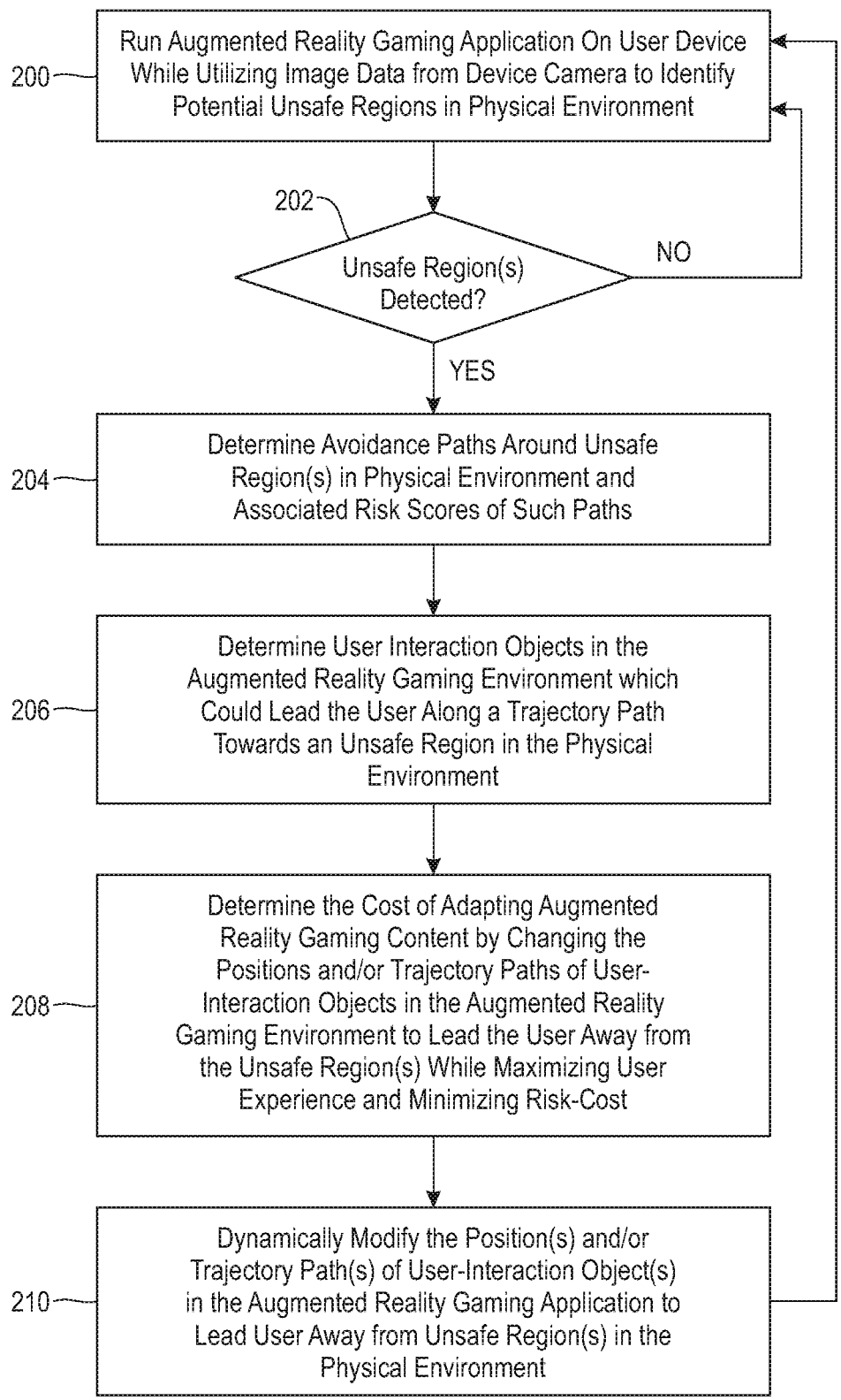
FIG. 2 is a flow diagram of a method for providing run-time adaptation of augmented reality gaming content that is rendered on a user computing device based on a context of a surrounding physical environment, according to an embodiment of the invention.

FIG. 2 is a flow diagram of a method for providing run-time adaptation of augmented reality gaming content that is rendered on a user computing device based on a context of a surrounding physical environment, according to an embodiment of the invention. During run-time execution of an augmented reality gaming application on a user computer device (e.g., mobile smart phone), the application will utilize image data captured by the device camera to identify potential unsafe regions (e.g., obstacles) in the physical environment surrounding the user (block 200). In response to detecting one or more unsafe regions in the physical environment (affirmative determination in block 202), a content adaptation process will be invoked (blocks 204, 206, 208, 210) to automatically adapt the content of the augmented reality game by changing the positions and/or the trajectories of user-interaction objects in the digital gaming environment such that the user's corresponding trajectory path in the physical environment (while playing game) is of minimal risk of the user traversing an unsafe region (e.g., banging into, or tripping over, an obstacle).

In particular, the content adaptation process involves runtime discovering and applying an optimal trajectory adaptation of a given user-interaction object within the augmented reality gaming environment for the purpose of leading a user away from unsafe regions (e.g., obstacles) in the physical environment. For example, virtual user-interaction objects are positioned in the augmented reality gaming environment such that the user's corresponding physical trajectory path does not have unnoticed obstacles which could risk injury to the user by tripping over or banging into obstacles in the user's physical trajectory path. As explained in further detail below, the content adaptation is performed in a way to maximize user gaming experience while minimizing the risk-score of directing the user along trajectory paths which avoid the unsafe regions.

In response to detecting one or more unsafe regions in the physical environment (affirmative determination in block 202), the AR content adaptation process will determine one or more avoidance paths around the detected unsafe region (s) in the physical environment and associated risk-scores of such determined avoidance paths (block 204). In one embodiment, this process is performed using one or more obstacle detection techniques, as explained in further detail below with reference to FIGS. 3A, 3B, and 3C.

The AR content adaptation process will then determine one or more virtual user-interaction objects within the augmented reality gaming environment which could possibly lead the user along a user trajectory path towards an unsafe region within the physical environment (block 206). In one embodiment, such virtual user-interaction objects are identified by a process which comprises (i) for each user-interaction object, extrapolating the trajectory path of the user-interaction object, (ii) extrapolating a trajectory path of the user, (iii) mapping the trajectory path of the user-interaction object with the trajectory path of the user, and (iv) correlating the trajectory path of the user-interaction object with the detected unsafe regions. In one embodiment, this process is performed using a process flow as discussed in further detail below with reference to FIG. 4.

Next, the AR content adaptation process will determine the cost of adapting the AR gaming content by changing the positions and/or trajectories of user-interaction objects in the augmented reality gaming environment to lead the user away from the unsafe region(s) while maximizing user experience and minimizing a risk-score (block 208). For example, the AR content adaptation process will estimate the user-experience cost (denoted herein as "UX-cost") for every possible change in the trajectory paths of user-interaction objects, wherein the term UX-cost refers to a loss in user experience. The system will correlate the UX-cost with the risk-scores of various zones to discover an optimal change in a trajectory path of the user, which maximizes the user experience while minimizing the risk-costs. In one embodiment, this cost analysis is performed using any suitable optimization technique to find the best solution from all feasible solutions with the UX-cost and the risk-cost as two (2) factors that are utilized for deciding a next best trajectory path of those user-interaction objects whose extrapolated path could pose a risk to leading the user to an unsafe region in the physical environment.

The AR content adaptation process will then dynamically modify the game trajectory path of one or more user-interaction objects of the augmented reality gaming application based on the above information by changing the positions and/or trajectories of user-interaction objects in the augmented reality gaming environment to lead the user away from the unsafe region(s) (block 210).

Figure 3A:
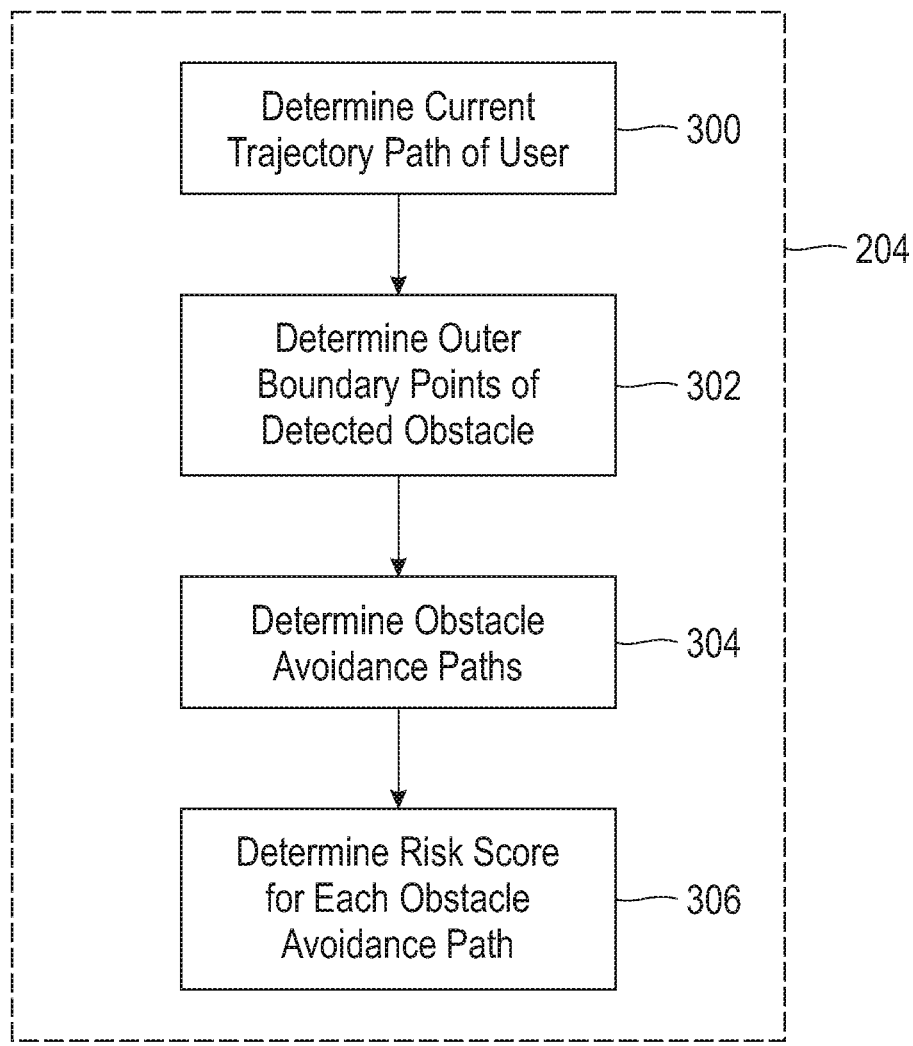
FIG. 3A is a flow diagram of a method for detecting one or more unsafe regions in a physical environment and determining one or more avoidance paths around the detected unsafe region(s) in the physical environment and associated risk-scores of such determined avoidance paths, according to an embodiment of the invention.
Figure 3B:
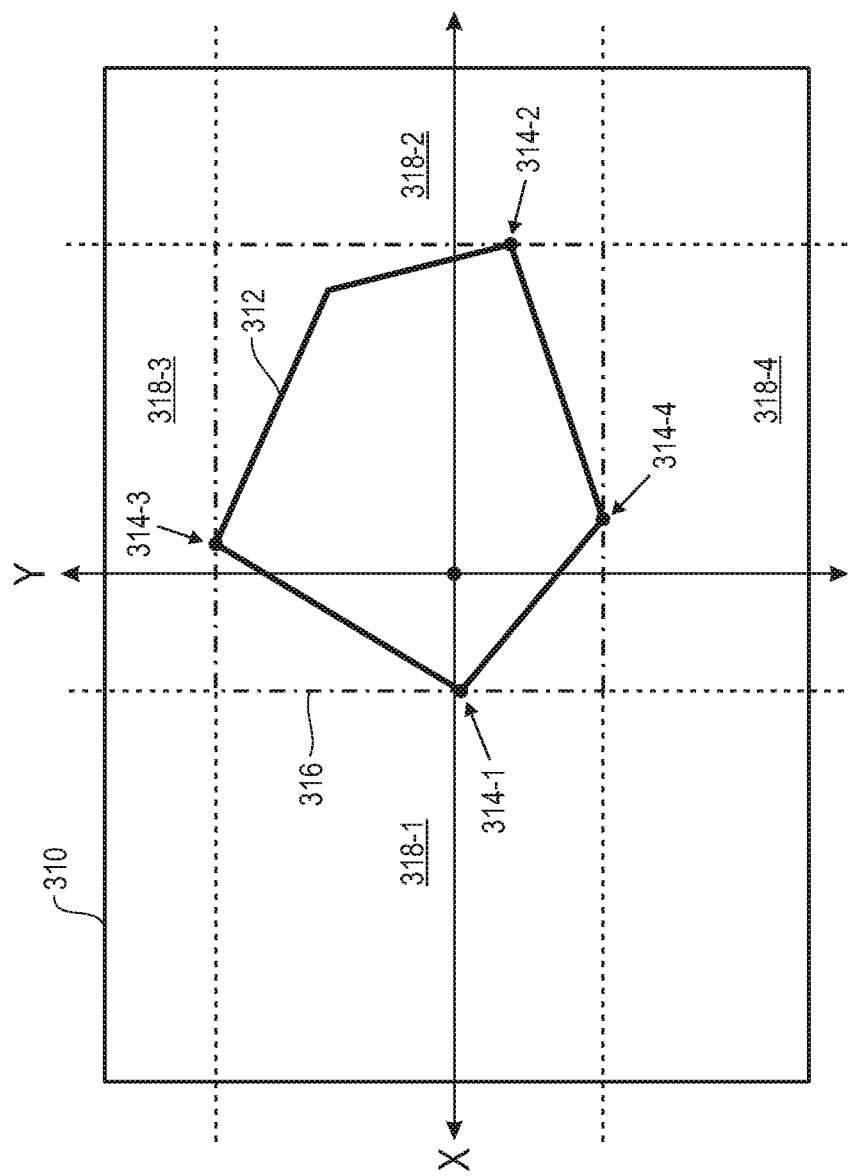
FIG. 3B schematically illustrates a method for detecting outer boundary points of a detected obstacle, according to an embodiment of the invention.
Figure 3C:
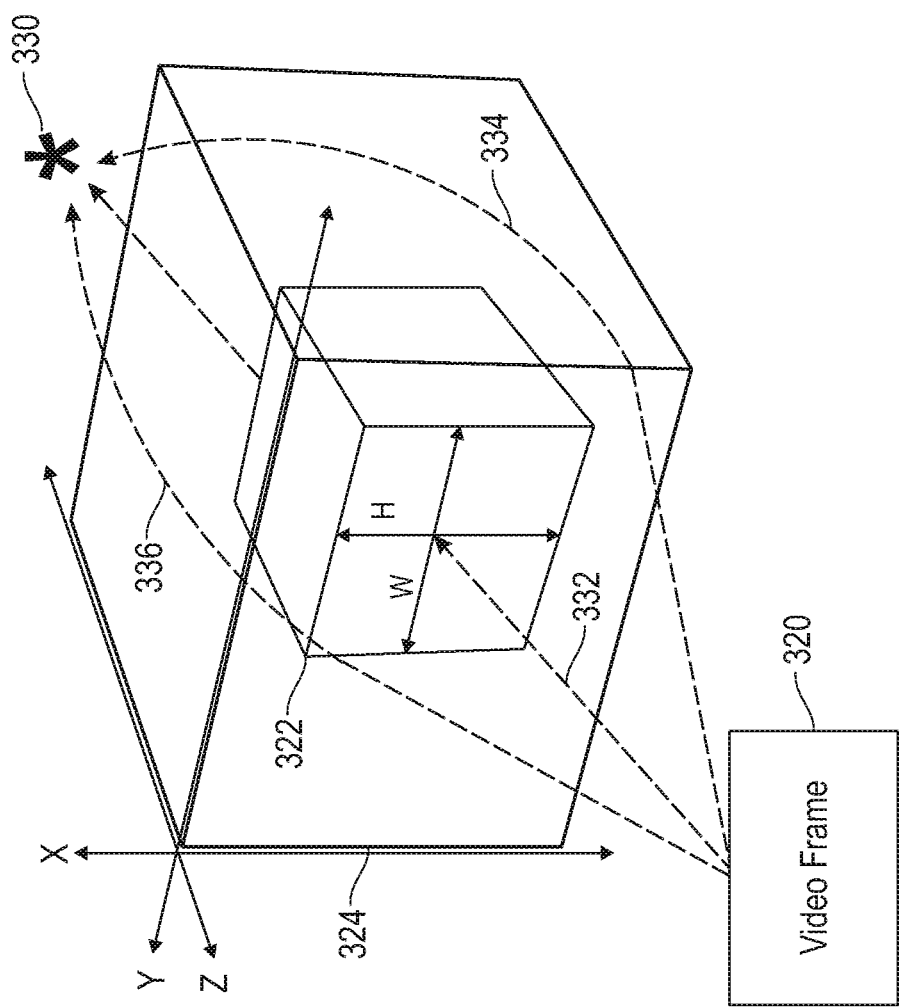
FIG. 3C schematically illustrates a method for determining obstacle avoidance paths around a detected obstacle, according to an embodiment of the invention.

FIGS. 3A-3C illustrate methods for detecting one or more unsafe regions in a physical environment and determining one or more avoidance paths around the detected unsafe region(s) in the physical environment and associated risk-scores of such determined avoidance paths. In particular, FIG. 3A is a flow diagram of a method for detecting unsafe regions and determining avoidance paths around the detected unsafe regions, according to an embodiment of the invention. The process flow of FIG. 3A illustrates an exemplary embodiment of the functionality of blocks 202 and 204 of FIG. 2. An initial step in the process of FIG. 3A is to determine a current trajectory path of the user (block 300). The current user trajectory path can be determined using various types of data that are indicative of user interaction/behaviors including, but not limited to, voice, gestures, motion, eye movement, facial tracking detection, etc., while the user is playing the augmented reality game. Indeed, as the user is playing the augmented reality game, it is possible to identify which object/control within the AR environment has been selected/driven by the user based on the above data.

Next, the process will determine outer boundary points of a detected obstacle (or other type of unsafe region) which is detected to exist within the physical environment, and which falls within the determined user trajectory path (block 302). FIG. 3B schematically illustrates a method for detecting outer boundary points of a detected obstacle. In particular, as shown in FIG. 3B, for a given 2D image frame 310 of the augmented reality game, the obstacle detection algorithm detects an obstacle 312 within the image frame 310 and estimates the position of extreme outer points 314-1 (e.g., left-most point), 314-2 (e.g., right-most point), 314-3 (e.g., top-most point), and 314-4 (e.g., bottom-most point), which make up the detected obstacle 312. In the exemplary embodiment, given the X-Y coordinate system shown in FIG. 3B (where the center point of the 2D image frame 310 comprises the origin of the X-Y coordinate system), the outer point 314-1 denotes the point of the obstacle 312 with the minimum X coordinate value, the outer point 314-2 denotes the point of the obstacle 312 with the maximum X coordinate value, the outer point 314-3 denotes the point of the obstacle 312 with the maximum Y coordinate value, and the outer point 314-4 denotes the point of the obstacle 312 with the minimum Y coordinate value.

As further schematically illustrated in FIG. 3B, the obstacle detection process utilizes the extreme outer points 314-1, 314-2, 314-3, and 314-4 of the detected obstacle 312 to determine a collision zone 316, and a plurality of collision-free zones 318-1, 318-2, 318-3 and 318-4 around the collision zone 316. In one embodiment, the collision zone 316 is defined by determining a bounding box (e.g., rectangle) which surrounds the detected obstacle 312, and which has sides that intercept the extreme outer points 314-1, 314-2, 314-3, and 314-4 of the detected obstacle 312. In the exemplary embodiment of FIG. 3B, the collision-free zones 318-1, 318-2, 318-3 and 318-4 on the left, right, top, and bottom sides of the detected obstacle 312 are defined by rectangular regions surrounding the collision zone 316.

Next, the process continues to determine obstacle avoidance paths around the detected obstacle (block 304). FIG. 3C schematically illustrates a method for determining obstacle avoidance paths around a detected obstacle of a given video frame 320. As shown in FIG. 3C, the 2D video frame 320 comprises a detected obstacle 322 (which is shown as a square for illustrative purposes) and a collision-free zone 324 that surrounds the detected obstacle 322. FIG. 3C further illustrates a target waypoint 330 and an initial user trajectory path 332 of a user towards the target waypoint 330, wherein the initial user trajectory path 332 is assumed to intercept a central point/region of the detected obstacle 32. As such, the process flow proceeds to determine obstacle avoidance paths 334 and 336 around the detected obstacle 322.

In the example embodiment of FIG. 3C, a side avoidance path 334 around the side of the obstacle 322 is determined by, e.g., (object width W/2)+Y, and an upper avoidance path 336 above the obstacle 322 is determined by, e.g., (obstacle height H/2)+X (where width, height, and X, Y values are in, e.g., centimeters). A next step is to determine if the determined upper avoidance path 336 or the side avoidance path 334 falls within the collision free zone 324 (e.g., safe boundary area) around the obstacle 322, and does not traverse through a portion of the collision zone (FIG. 3B). A next step is to determine the shortest reachable path to the waypoint 330 among the determined upper and side avoidance paths 334 and 336 (and other determined avoidance paths).

Next, referring again to FIG. 3A, the process continues to determine a risk score for each obstacle avoidance path around the detected obstacle (block 306). The risk scores can be delineated based on any suitable scale. For example, in one embodiment, the risk scores can be delineated as "high-risk", "medium-risk" and/or "low-risk" with respect to the effect of the detected obstacle on the user. For example, a high-risk avoidance path is one that is determined to have a high likelihood that the user can be injured by contact with the detected obstacle. A medium-risk avoidance path is one in which there is some probability that user movement may result in contact with the detected obstacle (e.g., user slightly trips but does not fall as a result of possible contact with the obstacle). A low-risk avoidance path is one in which there is a very low probability that the user movement will result in contact with the detected obstacle.

Figure 4:
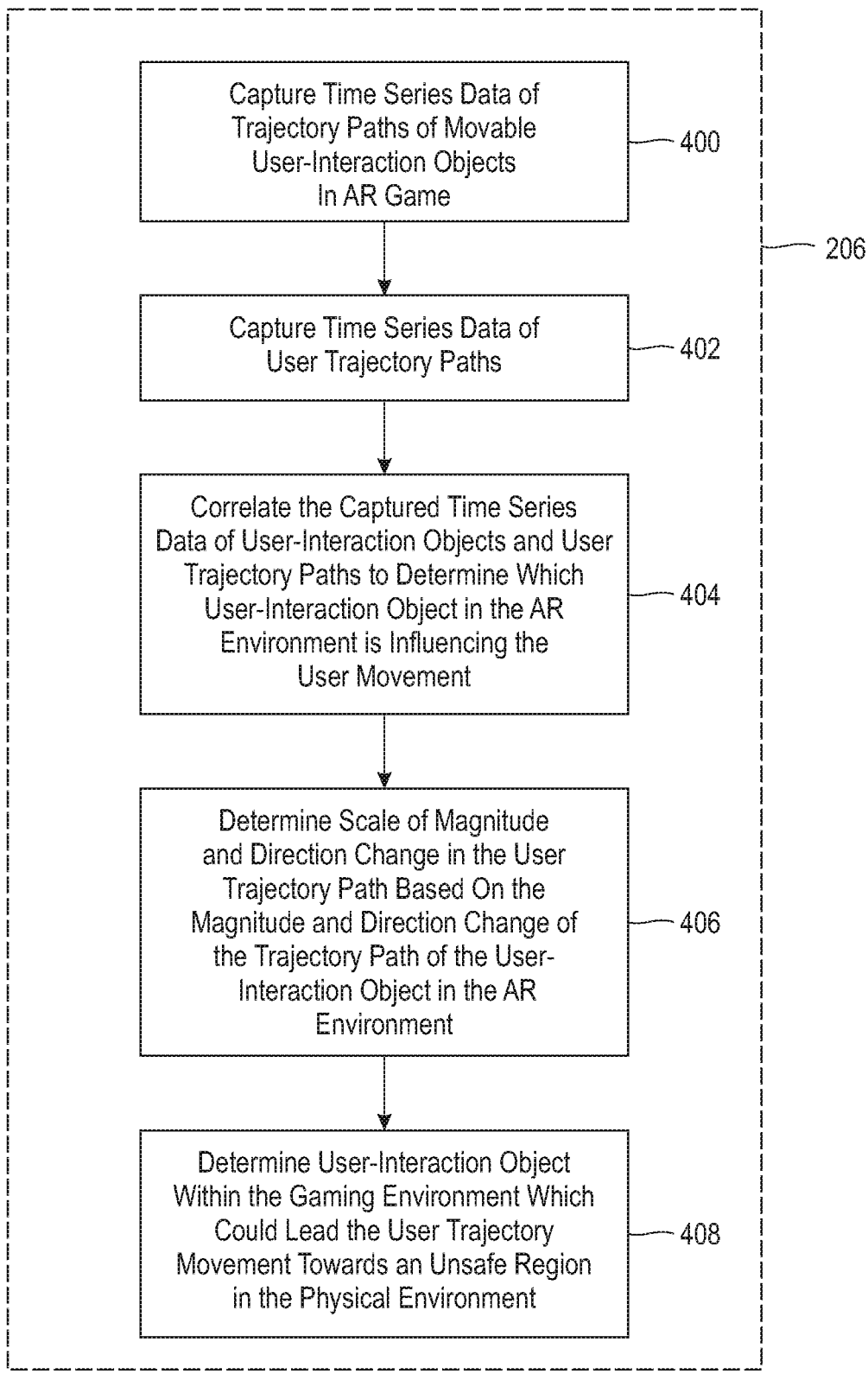
FIG. 4 is a flow diagram of a method for determining one or more user-interaction objects within an augmented reality gaming environment which could possibly lead the user along a user trajectory path towards an unsafe region within the physical environment, according to an embodiment of the invention.

FIG. 4 is a flow diagram of a method for determining one or more user-interaction objects within an augmented reality gaming environment which could possibly lead a user along a user trajectory path towards an unsafe region within the physical environment, according to an embodiment of the invention. In particular, FIG. 4 illustrates one exemplary embodiment of the functionality of block 206 of FIG. 2. An initial step is to capture time series data for trajectory paths of each movable user-interaction object in the augmented reality environment (block 400). In addition, the process captures time series data of user trajectory paths, for the same period of time as the captured time series data for the user-interaction object trajectory paths (block 402).

A correlation process is performed to correlate the captured time series data for the user-interaction object(s) and the user trajectory paths and to determine which user-interaction object within the augmented reality gaming environment is influencing the current user movement (block 404). For example, in a hunting augmented reality gaming application, if a user is tracking a user-interaction object to shoot the user-interaction object, then whenever the trajectory of the user-interaction object changes, the trajectory of the user will also change to continue tracking the user-interaction object. In this example, these related user and object trajectory patterns are extracted using pattern mining techniques on the time series data.

Next, the system will determine a scale of the magnitude and direction change in the user trajectory path based on the magnitude and direction change of the user-interaction object in the augmented reality environment (block 406). In one embodiment, this process is performed by training a model which, given a current trajectory change of an AR object, predicts the user trajectory path. For example, if the moving user-interaction object moves to the right with a velocity of x, and the user moves to the right with a velocity of y, these movement patterns can be determined and saved for subsequent analysis. In particular, the correlations between historical movement patterns of the user and the user-interaction objects can be extracted using known time series analysis methods, and such correlations of from historical movement patterns can be utilized to predict current movement patterns.

Next, based on the above steps, the system determines one or more user-interaction objects within the virtual AR gaming environment which could lead the user trajectory movement towards an unsafe region in the physical environment. In one embodiment, this process is performed by extrapolating the trajectory paths of the one or more user-interaction objects and mapping such object trajectory paths with the user's extrapolated path and correlating the mapped paths with the previously determined unsafe regions (or zones) (block 408).

Figure 5:
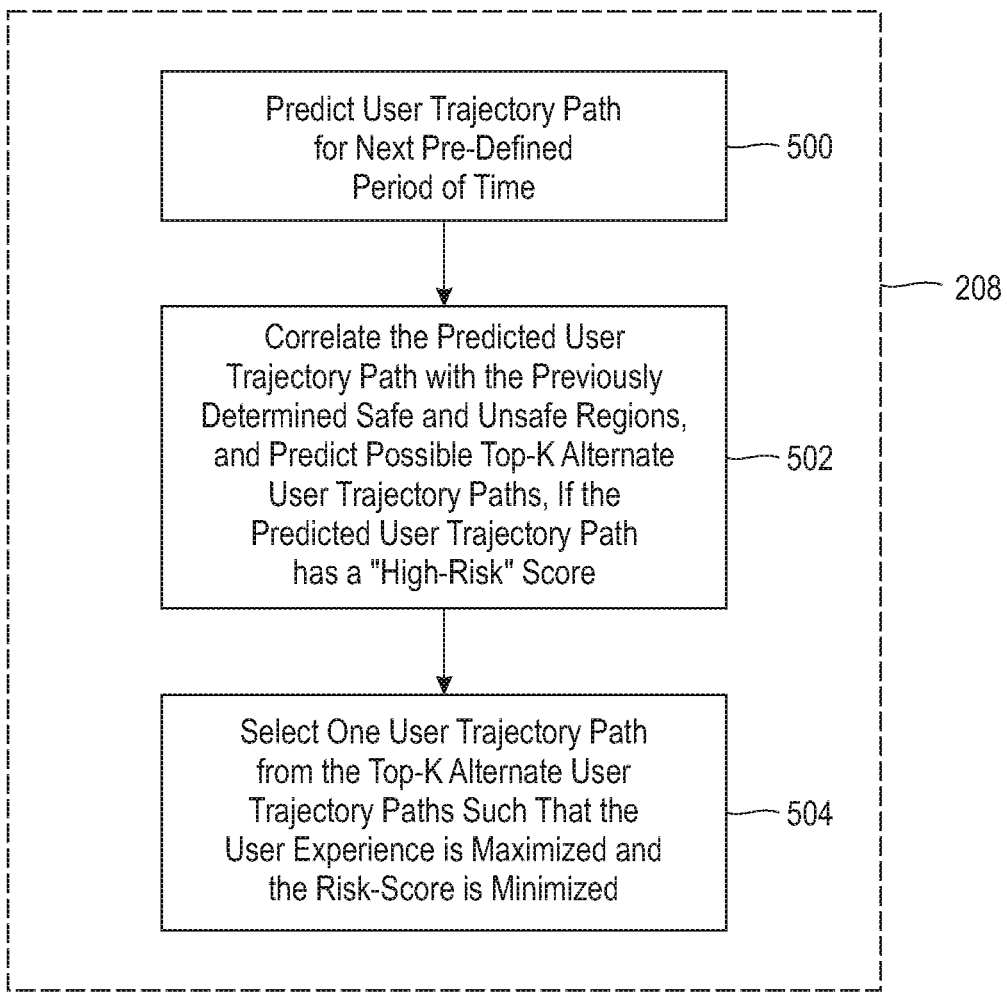
FIG. 5 is a flow diagram of a method for determining a cost of adapting augmented reality gaming content by changing the position or trajectory of user-interaction objects in the augmented reality gaming environment to lead the user away from an unsafe region while maximizing user experience and minimizing a risk-score, according to an embodiment of the invention.

FIG. 5 is a flow diagram of a method for determining the cost of adapting the AR gaming content by changing the positions and/or trajectories of user-interaction objects in the augmented reality gaming environment to lead the user away from the unsafe region(s) while maximizing user experience and minimizing a risk-score, according to an embodiment of the invention. In particular, FIG. 5 is a flow diagram of a method which is implemented in block 208 of FIG. 2 for determining the cost of AR gaming content adaptation, according to an embodiment of the invention. As an initial step, the process predicts the user trajectory path for next pre-defined period of time (e.g., "x" seconds) (block 500). The process then correlates the predicted user trajectory path with the previously determined safe and unsafe regions and predicts possible top-K alternate user trajectory paths, if the predicted user trajectory path has a "high-risk" score (block 502).

The process then selects one user trajectory path from the top-K alternate user trajectory paths such that the user experience is maximized, and the risk-score is minimized (block 504). In one embodiment, the user experience is quantified by the degree of trajectory path change/deviation from the designed initial path. In general, the AR game designers create an initial trajectory path which follows various UX concerns/aspects. In this regard, significant deviation from the initial trajectory path could lead to user experience loss. For example, a sudden 90-degree or 180-degree change in user movement could cause physical strain on the user, which is not desirable. The risk score for any avoidance path is obtained from the previous process as noted above. The process formalizes the cost determination as an optimization problem and selects the optimal path from the top-K suggested user trajectory paths such that user experience is maximized, and the risk-score is minimized.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 6, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 6:
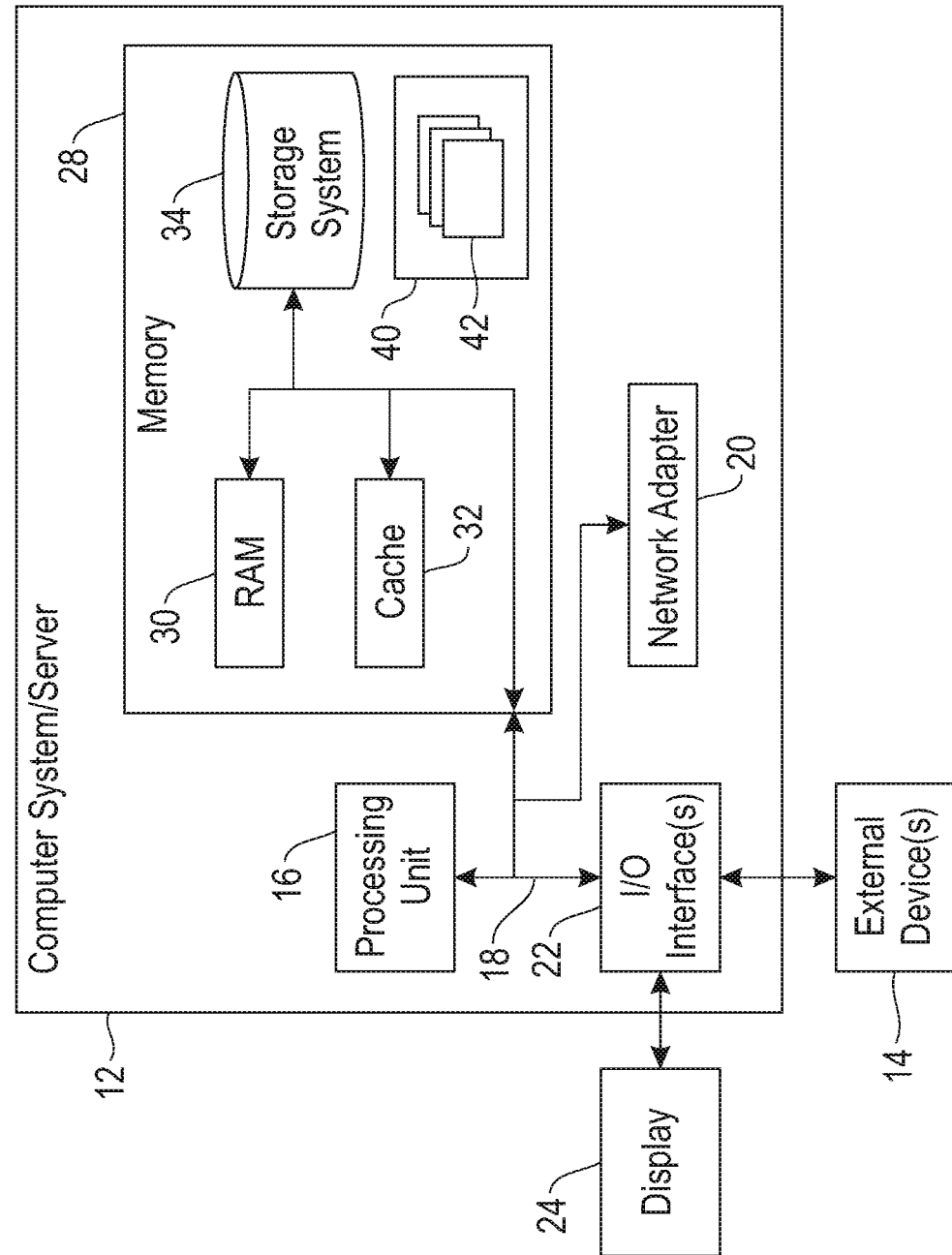
FIG. 6 is a system diagram of an exemplary computer system on which at least one embodiment of the invention can be implemented.

In FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random-access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
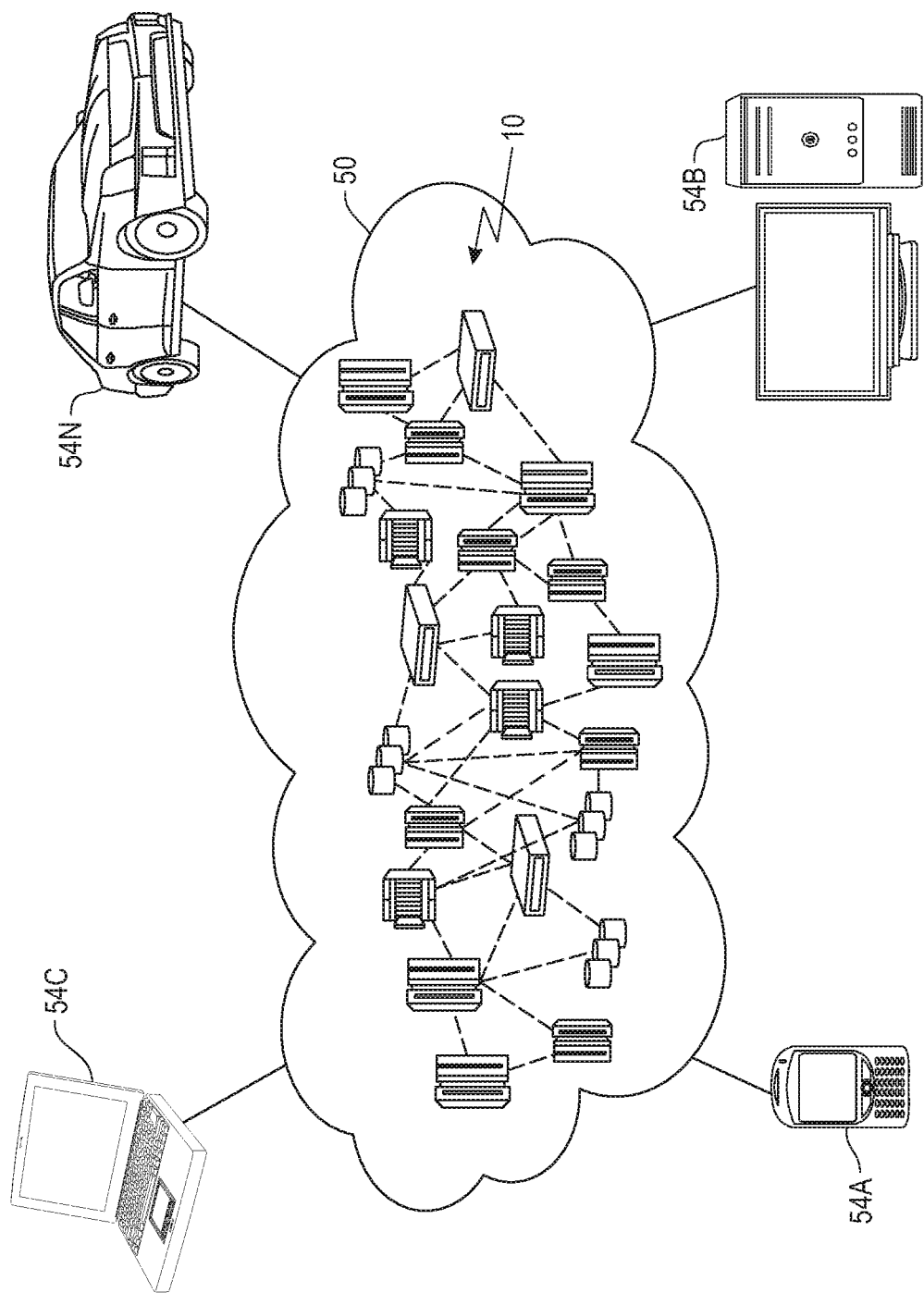
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
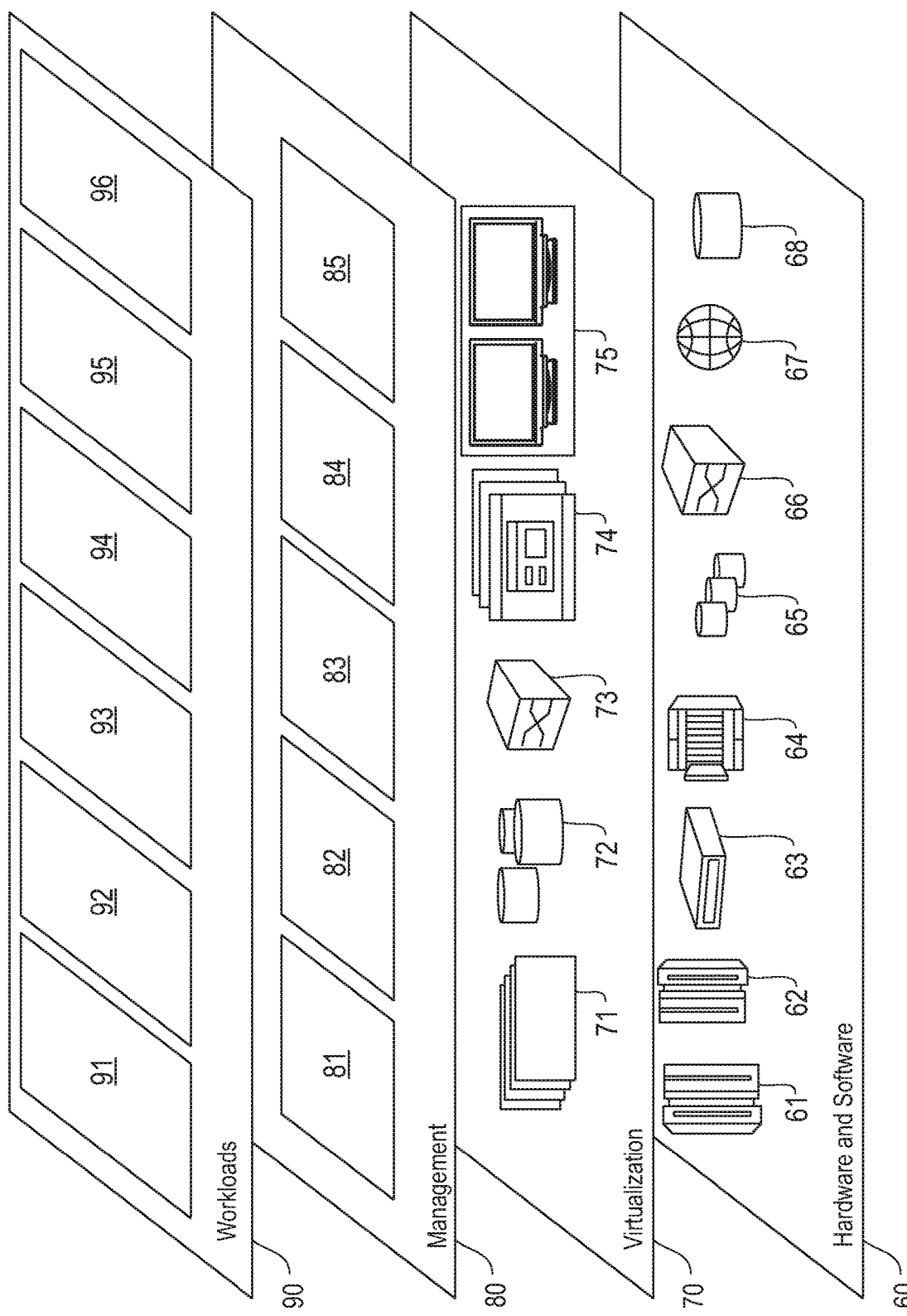
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various functions 96 implemented by the gaming server 120 in FIG. 1, and the various functions for AR gaming content adaptation performed by the gaming server 120 as discussed above in connection with FIGS. 1, 2, 3A-3C, 4 and 5.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A computer-implemented method comprising:
 streaming an augmented reality gaming application to a computing device;
 during run-time execution of the augmented reality gaming application, detecting an unsafe region in a physical environment surrounding the computing device; and
 responsive to detecting the unsafe region in the physical environment, automatically adapting content of the augmented reality gaming application by changing one of a position and a trajectory of a user-interaction object in a virtual gaming environment of the augmented reality gaming application such that the adapted content leads a user of the computing device on a user trajectory path that avoids the detected unsafe region in the physical environment, wherein said automatically adapting the content of the augmented reality gaming application comprises:

determining user trajectory avoidance paths around the detected unsafe region in the physical environment;

determining a user-interaction object within the augmented reality gaming environment which could lead the user along a user trajectory path towards the detected unsafe region within the physical environment;

determining a cost of adapting the content of the augmented reality gaming application with respect to changing one of a position and a trajectory of the determined user-interaction object; and changing one of the position and the trajectory of the determined user-interaction object, if the determined cost is reduced.

2. The computer-implemented method of claim 1, wherein said detecting the unsafe region in the physical environment comprises detecting the unsafe region based on image data of the physical environment captured by a camera of the computing device.

3. The computer-implemented method of claim 1, wherein said determining the cost of adapting the content comprises determining a user-experience cost for each of a plurality of changed trajectory paths of the determined user-interaction object, wherein the user-experience cost corresponds to a loss in user experience.

4. The computer-implemented method of claim 1, comprising:

changing one of the position and the trajectory of the determined user-interaction object, if the determined cost is reduced and a determined risk-score of an associated user trajectory avoidance path is reduced.

5. The computer-implemented method of claim 1, wherein said determining the user-interaction object within the augmented reality gaming environment which could lead the user along a user trajectory path towards the detected unsafe region within the physical environment comprises:

capturing time series data for trajectory paths of each movable user-interaction object in the augmented reality game;

capturing time series data of a current user trajectory path, for the same period of time as the captured time series data for the trajectory paths of the movable user-interaction objects; and correlating the captured time series data for the trajectory paths of the user-interaction objects and the current user trajectory path of the user to determine which user-interaction object within the augmented reality gaming environment is influencing the current user trajectory path of the user.

6. The computer-implemented method of claim 5, comprising:

determining a scale of a magnitude and direction change in the current user trajectory path based on a magnitude and direction change of the trajectory paths of the user-interaction objects in the augmented reality environment; and determining the user-interaction object within the gaming environment which would lead the user on a trajectory path towards the detected unsafe region in the physical environment by extrapolating the trajectory paths of the user-interaction objects, mapping the extrapolated trajectory paths of the user-interaction objects with the extrapolated user trajectory path and correlating the mapped the trajectory paths with the detected unsafe region.

7. The computer-implemented method of claim 1, wherein said determining the cost of adapting the content of the augmented reality gaming application with respect to changing at least one of the position and the trajectory of the determined user-interaction object comprises:

predicting a user trajectory path for a next pre-defined period of time;

correlating the predicted user trajectory path with determined safe and unsafe regions within the physical environment; and predicting top-K alternate user trajectory paths, responsive to the predicted user trajectory path having a high-risk score associated therewith.

8. The computer implemented method of claim 7, comprising:

selecting one predicted user trajectory path from the top-K alternate user trajectory paths such that the user experience is maximized, and a determined risk-score for the predicted user trajectory avoidance paths is minimized.

9. An article of manufacture comprising a computer readable storage medium having program instructions embodied therewith, wherein the program instructions are executable by a computer to perform a method comprising:

streaming an augmented reality gaming application to a computing device;

during run-time execution of the augmented reality gaming application, detecting an unsafe region in a physical environment surrounding the computing device; and responsive to detecting the unsafe region in the physical environment, automatically adapting content of the augmented reality gaming application by changing one of a position and a trajectory of a user-interaction object in a virtual gaming environment of the augmented reality gaming application such that the adapted content leads a user of the computing device on a user trajectory path that avoids the detected unsafe region in the physical environment, wherein said automatically adapting the content of the augmented reality gaming application comprises:

determining user trajectory avoidance paths around the detected unsafe region in the physical environment;

determining a user-interaction object within the augmented reality gaming environment which could lead the user along a user trajectory path towards the detected unsafe region within the physical environment;

determining a cost of adapting the content of the augmented reality gaming application with respect to changing one of a position and a trajectory of the determined user-interaction object; and changing one of the position and the trajectory of the determined user-interaction object, if the determined cost is reduced.

10. The article of manufacture of claim 9, wherein said detecting the unsafe region in the physical environment comprises detecting the unsafe region based on image data of the physical environment captured by a camera of the computing device.

11. The article of manufacture of claim 9, wherein said determining the cost of adapting the content comprises determining a user-experience cost for each of a plurality of changed trajectory paths of the determined user-interaction object, wherein the user-experience cost corresponds to a loss in user experience.

12. The article of manufacture of claim 11, wherein the program instructions are executable by the computer to perform the method further comprising:
changing one of the position and the trajectory of the determined user-interaction object, if the determined cost is reduced and a determined risk-score of an associated user trajectory avoidance path is reduced.

13. The article of manufacture of claim 9, wherein said determining the user-interaction object within the augmented reality gaming environment which could lead the user along a user trajectory path towards the detected unsafe region within the physical environment comprises:
capturing time series data for trajectory paths of each movable user-interaction object in the augmented reality game;
capturing time series data of a current user trajectory path, for the same period of time as the captured time series data for the trajectory paths of the movable user-interaction objects; and
correlating the captured time series data for the trajectory paths of the user-interaction objects and the current user trajectory path of the user to determine which user-interaction object within the augmented reality gaming environment is influencing the current user trajectory path of the user.

14. The article of manufacture of claim 13, wherein the program instructions are executable by the computer to perform the method further comprising:
determining a scale of a magnitude and direction change in the current user trajectory path based on a magnitude and direction change of the trajectory paths of the user-interaction objects in the augmented reality environment; and
determining the user-interaction object within the gaming environment which would lead the user on a trajectory path towards the detected unsafe region in the physical environment by extrapolating the trajectory paths of the user-interaction objects, mapping the extrapolated trajectory paths of the user-interaction objects with the extrapolated user trajectory path and correlating the mapped the trajectory paths with the detected unsafe region.

15. The article of manufacture of claim 9, wherein said determining the cost of adapting the content of the augmented reality gaming application with respect to changing one of the position and the trajectory of the determined user-interaction object comprises:
predicting a user trajectory path for a next pre-defined period of time;
correlating the predicted user trajectory path with determined safe and unsafe regions within the physical environment;
predicting top-K alternate user trajectory paths, responsive to the predicted user trajectory path having a high-risk score associated therewith; and
selecting one predicted user trajectory path from the top-K alternate user trajectory paths such that the user experience is maximized, and the risk-score for the predicted user trajectory avoidance paths is minimized.

16. A system, comprising:
a gaming server configured to:
stream an augmented reality gaming application to a computing device;
during run-time execution of the augmented reality gaming application, detect an unsafe region in a physical environment surrounding the computing device;
responsive to detecting the unsafe region in the physical environment, automatically adapt content of the augmented reality gaming application by changing one of a position and a trajectory of a user-interaction object in a virtual gaming environment of the augmented reality gaming application such that the adapted content leads a user of the computing device on a user trajectory path that avoids the detected unsafe region in the physical environment, wherein said automatically adapting the content of the augmented reality gaming application comprises:
determining user trajectory avoidance paths around the detected unsafe region in the physical environment;
determining a user-interaction object within the augmented reality gaming environment which could lead the user along a user trajectory path towards the detected unsafe region within the physical environment;
determining a cost of adapting the content of the augmented reality gaming application with respect to changing one of a position and a trajectory of the determined user-interaction object; and
changing one of the position and the trajectory of the determined user-interaction object, if the determined cost is reduced.

17. A computer-implemented method comprising:
streaming an augmented reality gaming application to a computing device of a user;
during run-time execution of the augmented reality gaming application, detecting an unsafe region in a physical environment surrounding the computing device of the user; and
responsive to detecting the unsafe region in the physical environment:
determining a user trajectory avoidance path around the detected unsafe region in the physical environment;
determining a user-interaction object within the augmented reality gaming environment which is influencing a current user trajectory path of the user towards the detected unsafe region;
determining a cost of adapting the content of the augmented reality gaming application with respect to changing one of a position and a trajectory of the determined user-interaction object; and
automatically adapting content of the augmented reality gaming application by changing one of a position and a trajectory of the determined user-interaction object if the determined cost is reduced such that the adapted content leads the user of the computing device along the determined user trajectory avoidance path around the detected unsafe region in the physical environment.

* * * * *